April 3, 1934.   H. A. WINNE ET AL   1,953,792

PARALLEL OPERATION DYNAMO-ELECTRIC MACHINE

Filed Feb. 11, 1933

Inventors:
Harry A. Winne,
Leonid A. Umansky,
by Charles E. Tullar
Their Attorney.

Patented Apr. 3, 1934

1,953,792

UNITED STATES PATENT OFFICE 1,953,792

PARALLEL OPERATION DYNAMO-ELECTRIC MACHINE

Harry A. Winne and Leonid A. Umansky, Schenectady, N. Y., assignors to General Electric Company, a corporation of New York Application February 11, 1933, Serial No. 656,280

6 Claims. (Cl. 171—312)

Our invention relates to the parallel operation of a plurality of generators arranged to supply current to a plurality of mechanically connected motors, and has for an object the provision of a simple and reliable means for insuring an equal division of load between the generators and motors.

Our invention is particularly applicable to Ward-Leonard control systems for rolling mill drives, elevator and hoist drives and the like, which systems provide a plurality of speeds in one or in both directions. A sub-division of the driving motor capacity into two or more units, mechanically connected to each other, either directly or through the mechanical load, greatly decreases the motor inertia, and, consequently, greater rates of acceleration and retardation may be obtained. Furthermore, the power demands of many present installations are so great that it has been more advantageous from the standpoint of manufacturing, transportation and erection, as well as from the standpoint of first cost, to provide a plurality of machines to deliver the desired amount of power.

It is a well recognized fact that two dynamo-electric machines cannot be designed so that they will have identical operating characteristics. Variations in the magnetic properties of the material from which the magnetic frames are constructed will cause different flux densities in the two machines for given magnetomotive forces. Similarly, variations in the length of the air gaps, etc., of the two machines will cause different fluxes in the two machines. Even if the separately excited field windings of each machine are connected in series so that theoretically an equal amount of flux would be produced on their respective generator armatures, the practical result is that one machine tends to carry more than its proper proportion of the load.

In carrying out our invention in one form, we provide means for insuring a predetermined division of load between the generators and between the motors. More specifically, we provide circuits for each motor armature that are electrically independent but magnetically interlinked through generator series field windings so that load balance is obtained under all operating conditions for both the motors and the generators.

Figure 1:
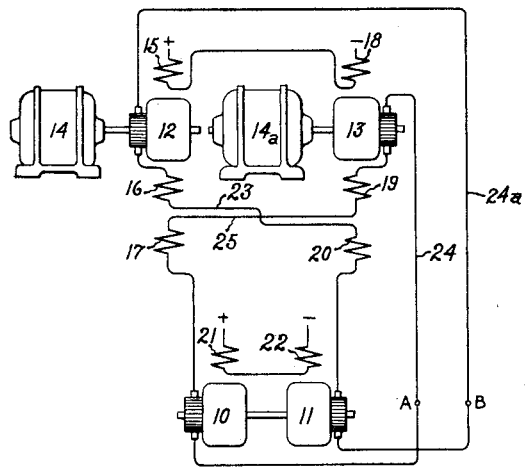
Figure 2:
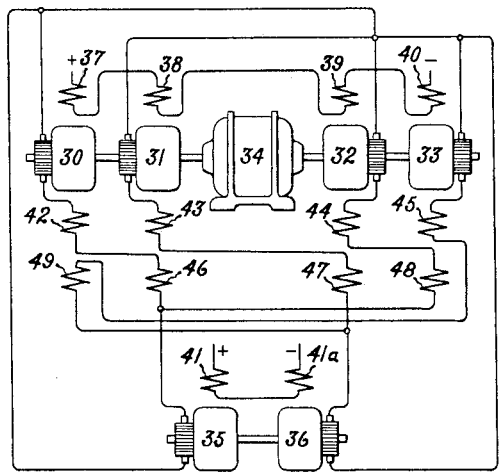

For a more complete understanding of our invention, reference should now be had to the drawing, in which Fig. 1 shows a simplified system for a pair of generators supplying current to a pair of motors, while Fig. 2 shows a modification of our invention wherein two pairs of generators are arranged so that each pair supplies current to the respective armatures of a pair of motors.

Referring to the drawing, we have shown our invention in one form as applied to a pair of direct current motors 10 and 11, whose armatures are mechanically connected together. The motor current is supplied by the generators 12 and 13, the armatures of which are respectively driven by the motors 14 and 14a, which may be induction or synchronous motors. The generator 12 is provided with a separately excited field winding 15, a differential series field winding 16 arranged to be excited by its own armature current, and an accumulative field winding 17 connected to be excited by the armature current of the generator 13. Similarly, the generator 13 is provided with a separately excited field winding 18, with its differential series field winding 19 excited by its own armature current, and its accumulative field winding 20 excited by the armature current of the generator 12. The motors 10 and 11 are respectively provided with separately excited field windings 21 and 22.

In explaining the operation of our invention in the form shown in Fig. 1, it will be assumed that the generators 12 and 13 are being rotated at approximately constant speed by the induction motors 14 and 14a, and that the field windings 15 and 18 connected in series are energized, as indicated by the symbols, from a suitable source of direct current supply. It will also be assumed that the separately excited motor windings 21 and 22, also connected in series, are similarly energized from a suitable source of supply so that the magnetomotive force produced by each winding is approximately equal to the magnetomotive force produced by the other winding. Assuming that the lower brush of the generator 12 is positive, it will be observed that current may flow through the differential winding 16, conductor 23, accumulative field winding 20, the armature of the motor 11, and by conductor 24a to the other side of the armature of the generator 12. Similarly, current may flow from the armature 13, differential field winding 19, conductor 25, accumulative field winding 17, armature of motor 10 and by conductor 24 to the other side of the armature of the generator 13. Therefore, if the generator 12 tends to carry a greater proportion of the load, it will be observed that the current flowing through the differential winding 16 will tend to decrease the voltage of generator 12, and hence its current, while the accumulative field winding 20 of the generator 13 will tend to increase its voltage, and hence its current. The result is that the load carried by the generators 12 and 13 is automatically distributed until a predetermined load division is obtained.

If the generators 12 and 13 have the same capacity, then the differential and accumulative field windings of each machine may have the same number of turns so that when the load current of the generators 12 and 13 is equal, the differential and cumulative fields exactly neutralize each other.

If the capacity or the load rating of the generator 12 is greater than the generator 13, it will of course be understood that the turns on the accumulative and differential field windings will be selected so that an accumulative field winding will exactly neutralize the effect of a differential field winding when each generator is carrying its proper proportion of the load. For example, if the generator 12 is arranged to supply a third more current to the motor 11, the differential field winding 16 will have a fewer number of turns, so that the magnetomotive force produced thereby will exactly equal the magnetomotive force produced by the accumulative field winding 17 when the generator 13 is carrying its proper proportion of the load. Similarly, the accumulative field winding 20 of the generator 13 will have a fewer number of turns, so that the differential field winding 19 will exactly neutralize its effect under normal operating conditions, i. e., each generator carrying its proper share of the load. The effect of the accumulative and differential field windings will then be as described above, and in case of an unbalance the load will be shifted from one generator to the other until each carries its proper proportion of the load. Inasmuch as the load current supplied to each motor from a generator is controlled, it will be readily understood that each motor necessarily carries its proper share of the load, because its armature current is controlled by its supply generator. It will, therefore, be seen that we have provided a system for maintaining an equal or a predetermined load division between a pair of generators driven substantially in synchronism, the generators supplying current to a pair of mechanically connected motors, the load circuits being electrically independent circuits but magnetically interlinked.

It will be understood that any two points, one in each of these two circuits, can be connected to each other without changing the electrical independence of these circuits. For instance, a point A of the circuit of the motor armature 10 and a point B of the circuit of the motor armature 11 can be connected together. Only one point of one circuit would then be connected to a point of the other circuit; therefore, no current could flow from one circuit to the other. Consequently, in this application, by electrically independent circuits, we mean such circuits which have not more than one point in common with each other. Therefore, a change in current in one load circuit does not affect the current flow in the other load circuit except by the magnetic interlinkage of the circuits. Since the magnetic interlinkage is provided in the respective load circuits, it will be understood that series differential and accumulative field windings can be provided on the motors instead of on the generators to maintain a predetermined division in load between the machines. However, for reversing service, complicated switching means are required to reverse the series field windings. Therefore, in the preferred form of the invention the complicated switching means is not needed. To reverse the motors it is only necessary to reverse the polarity of the current supplying the separately excited generator field windings.

The principles explained in connection with Fig. 1 are readily applicable to any installation where a plurality of generators are arranged to supply current to a plurality of motors. If a generator is provided for each motor the connections are made substantially as described in connection with Fig. 1.

Referring now to Fig. 2, we have shown a further modification of our invention wherein the number of generators are a multiple of the number of motors. In this case the generators are connected in groups, each group supplying load current to a single motor. Thus one group comprises the generators 30 and 32 and the other group the generators 31 and 33. In this case the generators are driven by a motor 34 though, of course, separate motors could be used so long as the generators are driven at substantially the same speed. The generators are respectively provided with separately excited field windings 37, 38, 39 and 40 connected in series, while the series connected separately excited field windings 41 and 41a supply excitation for the motors 35 and 36. It will be observed that the load circuit from the first group of generators 30 and 32 is electrically independent of the motor supply circuit of the second group or generators 31 and 33. However, the generators of each group are magnetically interlinked with each other and with the generators of the other group so that the load divisions between the respective generators and between the respective groups are accurately controlled. Consequently, the load division between the motors is also accurately controlled. This magnetic interlinking or coupling is obtained by providing differential series field windings 42, 43, 44 and 45 on the generators 30, 31, 32 and 33 and connecting an accumulative field winding of a different generator in series with a differential field winding. It will be seen that the generator 30 may supply current to the motor 35 through its differential field winding 42 and the accumulative field winding 46 of the generator 31. Similarly, the generator 31 is connected to supply current to the motor 36 through its differential field winding 43 and the accumulative field winding 47 of the generator 32. The latter generator supplies current to the motor 35 through its differential field winding 44 and the accumulative field winding 48 of the generator 33. The generator 33 is connected to supply current to the motor 36 through its differential field winding 45 and the accumulative field winding 49 of the generator 30. It will be further observed that the generators 30 and 32 are connected in parallel to supply current to the motor 35 while these generators are magnetically interlinked with the generators 31 and 33. Any tendency on the part of one generator or a group of generators to assume more than its proper proportion of the load results in a magnetic interaction between the corresponding field windings so that the load division between the generators remains substantially constant. Inasmuch as the respective generators supplying the load current to one motor are magnetically coupled to the generators supplying the load current to the other motor, the load division between the motors is also insured.

While we have shown particular embodiments of our invention, it will be understood of course that we do not wish to be limited thereto, since many modifications may be made, and we therefore contemplate by the appended claims to cover any such modifications as fall within the true spirit and scope of our invention.

What we claim as new and desire to secure by Letters Patent of the United States is:

1. In combination, a group of dynamo-electric machines mechanically connected together, a second group of dynamo-electric machines arranged to be driven substantially in synchronism with each other, connections for connecting said machines of said second group in electrically independent local circuits with said machines of said first group, a separately excited field winding for each of said machines, and magnetic means associated with each of the machines of one group responsive to the load current flowing through said local circuits for magnetically interlinking said circuits so as to maintain a predetermined load division between the machines of each of said groups.

2. In a system of distribution, the combination of a plurality of mechanically connected generators and a plurality of mechanically connected motors, connections for connecting the armature of each of said generators to the armature of one of said motors in an electrical circuit independent of the armature circuits of other of said generators, and means differentially responsive to the load currents of said generators for producing a corrective component of excitation on each of said generators in a direction to cause the load division between said generators and said motors to remain at a substantially constant predetermined value.

3. In a system of distribution, the combination of a plurality of generators arranged to be driven substantially in synchronism, a plurality of mechanically connected motors, a series accumulative and a series differential field winding for each of said generators, connections for connecting each generator armature in series with its own series differential field winding and an accumulative field winding of another of said generators, connections for connecting at least one of said generators in a motor supply circuit to one of said motors, connections for connecting at least one of said other generators in a motor supply circuit for another of said motors, the said motor supply circuits being electrically independent of each other but magnetically interlinked through said generator field windings, so that a predetermined load division is maintained between each of said generators and between each of said motors.

4. In a system of distribution, the combination of a plurality of motors, a plurality of generators arranged to be driven in synchronism, series differential and series accumulative field windings on each of said generators, connections for connecting the armature of each generator through its differential field winding and the accumulative field winding of another of said generators, the said generators being connected in groups of two or more to supply load current to each of said motors, each of said groups of generators being electrically independent but magnetically interlinked through said field windings so that the magnetomotive forces produced by said windings insure a predetermined load division between said generators and between said motors.

5. The combination with a pair of mechanically connected generators and a pair of mechanically connected motors, of connections for connecting the armature of one generator independently of the armature of the other generator to one of said motors, and means differentially responsive to the load currents of said generators for maintaining in proper proportion the load division between said generators and between said motors.

6. A pair of mechanically connected direct current motors, a pair of direct current generators mechanically connected together, each of said generators being provided with an accumulative and a differential field winding, connections for connecting the differential field winding of one generator in series with its armature and the accumulative field winding of the other generator and the armature circuit of one of said motors, and connections for connecting the differential field winding of the other generator in series with the accumulative winding of the first generator and in series with the armature circuit of the other motor, so that said armature circuits of said generators are electrically independent but magnetically interlinked, the said differential and accumulative field windings serving to maintain a substantially constant ratio of load division between said generators and between said motors.

HARRY A. WINNE.
LEONID A. UMANSKY.